US008402506B2

(12) United States Patent
Mills et al.

(10) Patent No.: US 8,402,506 B2
(45) Date of Patent: Mar. 19, 2013

(54) INFORMATIONAL ALERT MESSAGING FOR DIGITAL HOME SERVICES

(75) Inventors: Michael Mills, Redwood City, CA (US); Philip Mckay, San Francisco, CA (US); Michael Hoch, Campbell, CA (US); Kumiko Tanaka Toft, Carlsbad, CA (US); Rod Perkins, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1614 days.

(21) Appl. No.: 11/327,188

(22) Filed: Jan. 5, 2006

(65) Prior Publication Data

US 2007/0006277 A1    Jan. 4, 2007

Related U.S. Application Data

(60) Provisional application No. 60/641,787, filed on Jan. 5, 2005, provisional application No. 60/641,717, filed on Jan. 5, 2005.

(51) Int. Cl.
*H04N 7/10* (2006.01)
*H04N 7/025* (2006.01)

(52) U.S. Cl. .......................................... 725/153; 725/32

(58) Field of Classification Search .................... 725/34, 725/109, 110, 112, 113, 136
See application file for complete search history.

(56) References Cited

U.S. PATENT DOCUMENTS

| 6,668,278 | B1 * | 12/2003 | Yen et al. ...................... 709/218 |
| 7,478,078 | B2 * | 1/2009 | Lunt et al. ......................... 707/1 |
| 2002/0124252 | A1 * | 9/2002 | Schaefer et al. ................ 725/33 |
| 2002/0157099 | A1 * | 10/2002 | Schrader et al. ................ 725/51 |
| 2005/0262542 | A1 * | 11/2005 | DeWeese et al. ............. 725/106 |
| 2006/0174277 | A1 * | 8/2006 | Sezan et al. ..................... 725/46 |

* cited by examiner

*Primary Examiner* — Scott Beliveau
*Assistant Examiner* — Christine Kurien

(57) ABSTRACT

Systems and methods are provided to implement a number of improvements to the consumption process for television (and other services), including personalization, community viewing, shared presence and context, messaging, access to ratings and recommendations (including community reviews), alerts, etc. A content distribution server manages the delivery of television, messaging, on demand audio or video, online gaming, and other entertainment and information services to a plurality of client devices (e.g., televisions, personal computers, enhanced telephones, etc.). The server components include a television application component, messaging component, and application components that integrate the various services to deliver, for example, enhanced television, which includes television broadcast enhanced with messaging services, Internet access, informational alerts, and/or the like. Informational alerts allow a user to customize the timing and types of alerts being presented in parallel with the delivery of other services, such as television broadcast or online gaming.

18 Claims, 9 Drawing Sheets

INFORMATIONAL ALERT MESSAGING FOR DIGITAL HOME SERVICES

PRIORITY CLAIM AND RELATED APPLICATIONS

This application claims the priority of U.S. provisional application No. 60/641,787, titled SYSTEM AND METHOD FOR EXTENDING ONLINE SERVICES TO OTHER PLATFORMS, filed Jan. 5, 2005; and U.S. provisional application No. 60/641,717, titled SYSTEM AND METHOD FOR ACCESSING PERSONALIZED MULTIMEDIA CONTENT, filed Jan. 5, 2005, which are all incorporated herein by reference in its entirety.

This application is related to the following patents and pending applications, each of which is hereby incorporated herein by reference in its entirety:

Application Serial Number to be assigned, titled Framework For Providing Ancillary Content In A Television Environment, filed Jan. 5, 2006, Ser. No. 11/327,665; and Application Serial Number to be assigned, titled Framework For Delivering A Plurality of Content And Providing For Interaction With The Same In A Television Environment, filed Jan. 5, 2006, Ser. No. 11/327,198.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention is directed to facilitating messaging and messaging-related services in a television environment or the like. More specifically, the present invention is directed to facilitating the interaction between messaging and television platforms to allow for interaction between users in a television environment or the like.

BACKGROUND OF THE INVENTION

Systems for distributing television content are generally well known to those of skill in the art. Over the past several decades, the number of systems designed for the distribution and consumption of television content has proliferated, while the number of available channels for television content has skyrocketed. For example, viewers are now able to consume television content over cable, as an over the air broadcast, via satellite, through fiber optics, as well as from other point (and multipoint) to multipoint distribution systems, each potentially offering several hundreds of channels of scheduled and on-demand television content. Consumers have had difficulty in effectively utilizing the pool of available television content due to a lack of useful tools for analyzing programming to determine the television content that is potentially the most enjoyable to the user. Furthermore, the viewing of television content has heretofore been an essentially solitary experience outside of viewing television content with another individual located at the same location.

Messaging services, as well as platforms for providing the same, are also well know to those of skill in the art. A messaging platform provides a foundation for shared communications between users and allows a user to identify one or more "buddies", which are users of the messaging platform who are in a given user's social network. For example, two users using a messaging client, each in communication with a messaging server, may exchange instant message communications between their respective clients. Using messenger clients and servers, users may also engage in a shared web browsing experience, as well as sharing other applications. Unfortunately, there are no techniques for implementing the shared experience and interactivity with other users of a messaging platform when viewing television content.

In order to overcome these shortcomings and other problems associated with existing apparatuses and techniques for viewing television content and interacting with messaging platforms, systems and methods are needed to enhance a shared viewing experience of television content, as well as provide messenger and messenger-related services and content within the framework of viewing television content, in addition to other improvements to the relevant art(s).

SUMMARY OF THE INVENTION

Systems and methods are provided to implement a number of improvements to the consumption process of television (and other entertainment and/or information media), including personalization, community viewing, shared presence and context, messaging, access to ratings and recommendations (including community reviews), alerts, and the like.

In an embodiment, an informational alert service is initiated, on demand or on a periodically scheduled basis, to enhance the content of an entertainment or information service that is being presented on a client device (e.g., television, personal computer, enhanced telephone, or the like). When the informational alert service is initiated, an informational alert object is superimposed over the currently displayed entertainment or information content, such as a television broadcast.

The informational alert object can include information about a variety of topics, such as weather, traffic, sports, business, finance, politics, and the like. In an embodiment, the informational alert object rotates among the available topics to provide news captions for each related topic. In addition to news topics, the informational alert object can also provide a link to other types of services, such as electronic messaging, web browsing, and the like.

A user may select and activate an informational alert object by operating an input device, such as a remote control unit, pointing device, keyboard, voice communications interface, or the like. Upon activation, the activated informational alert object is replaced with an expanded view of the alert object. The expanded informational alert object is similarly superimposed over the entertainment or information content that is concurrently being presented on the client display.

The expanded informational alert object includes a vertical toolbar and a horizontal toolbar. The vertical toolbar includes a listing of additional news captions that are related to the topic of the activated informational alert object. The horizontal toolbar includes a listing of other available topics and/or services. The user may operate an input device to traverse the vertical and/or horizontal toolbars, and switch back and forth among the available options.

BRIEF DESCRIPTION OF THE DRAWINGS

The invention is illustrated in the figures of the accompanying drawings, which are meant to be exemplary and not limiting, in which like references are intended to refer to like or corresponding parts, and in which.

DETAILED DESCRIPTION OF THE INVENTION

In the following description of embodiments of the invention, reference is made to the accompanying drawings that form a part hereof and in which is shown by way of illustration a number of specific embodiments in which the invention may be practiced. It is to be understood that other embodiments may be utilized and structural changes may be made without departing from the scope of the present invention.

Figure 1:
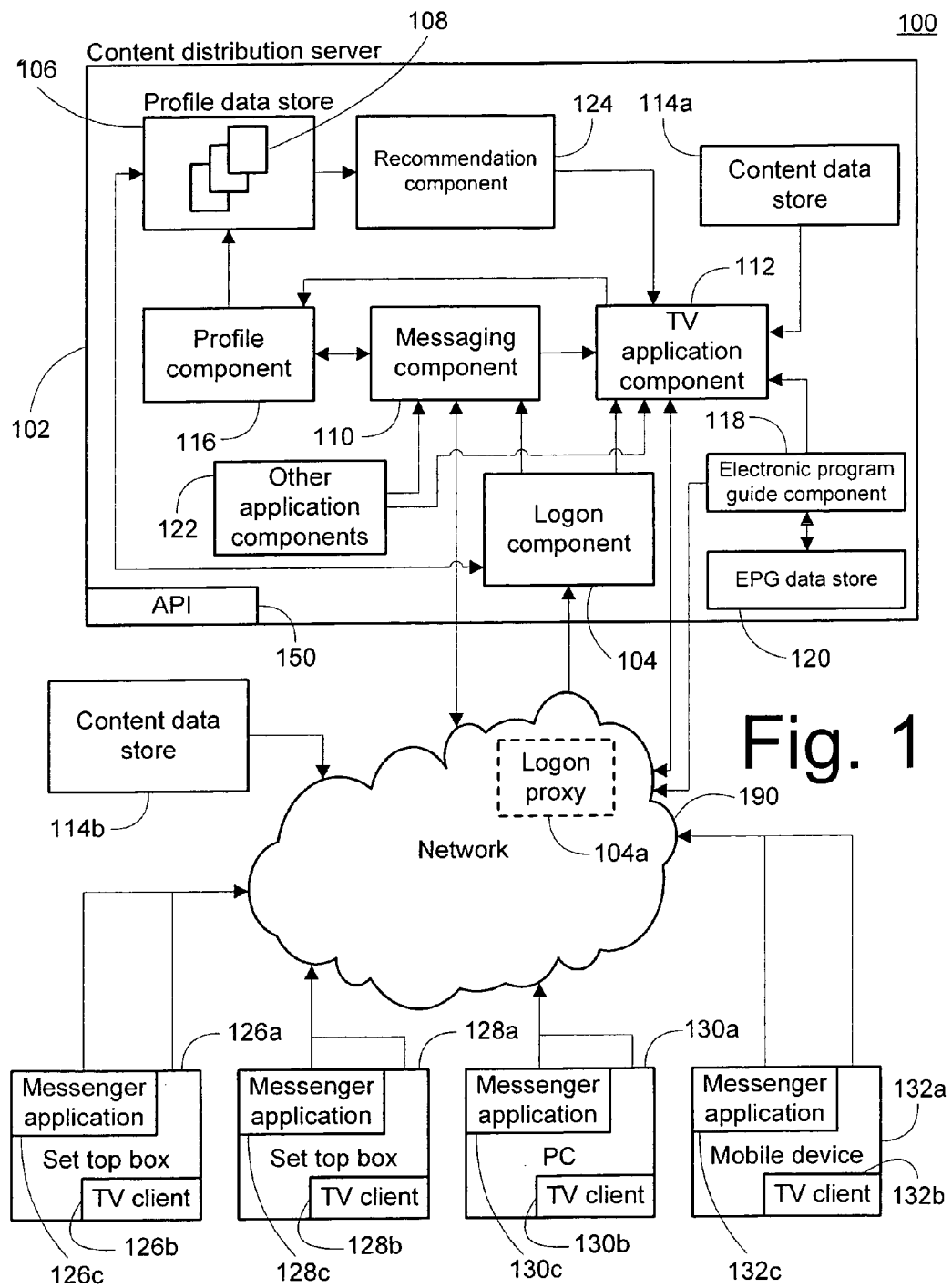
FIG. 1 illustrates a system for providing access to enhanced services and content in conjunction with television content and ancillary television content according to an embodiment of the present invention.

FIG. 1 presents a block diagram illustrating an embodiment of a system 100 for distributing entertainment and/or information content over a communications network 190. The distributed content includes television and/or radio broadcast, on-demand video and/or audio services, messaging services, online gaming services, and other types of multimedia interactive or non-interactive services.

According to an embodiment of FIG. 1, a content distribution server 102 comprises one or more software, firmware, and/or hardware components to facilitate, for example, the delivery of television (TV) and television-related content in conjunction with messaging and messaging-related content and services. However as described above, server 102 also includes components that facilitate the delivery of other types of services, in addition to or in lieu of, television and messaging services. Such services include, but are not limited to, radio broadcast, on-demand video and/or audio, online gaming, and the like.

The components of server 102 include, but are not limited to, a logon component 104, a messaging component 110, a TV application component 112, a profile component 116, an electronic program guide (EPG) component 118, a recommendation component 124, and other application components 122. The content distribution server 102 also comprises one or more data stores for persistent storage of information used in providing both television and messaging content and services, or the like, including, but not limited to, a profile data store 106, content data stores 114a and 114b, and an EPG data store 120.

The content distribution server 102 is communicatively coupled with a network 190, which may include a connection to one or more local and/or wide area networks, such as the global Internet. Network 190 enables television, radio, and other services to be distributed over broadcast licensed radio frequency (RF) spectrum, or via digital cable, satellite (e.g., Direct Broadcast Satellite (DBS)), microwave, or other licensed or unlicensed wireless RF air interface technology spectrum.

Using the network 190, the content distribution server 102 is capable of accessing local 114a and remote 1114b content data stores for television content, as well as providing television and messaging services, including combinations thereof, to clients 126a, 128a, 130a, and 132a. The content distribution server 102 is operative to provide television and messaging content and services, or the like, to any client device capable of running TV client software 126b, 128b, 130b, and 132b, as well as a messenger application 126c, 128c, 130c, and 132c. For example, client devices may include set top terminals 126a and 128a that use a television as a display device, computer hardware such as a personal computer 130a and a mobile device 132a, such as a cellular handset or a personal digital assistant (PDA). Other types of electronic communications equipment is contemplated as falling within the scope of the invention including, but not limited to, digital media adapters, digital video disc (DVD) players, connected televisions and other networked consumer electronic devices.

When a given client 126a, 128a, 130a, and 132a initially accesses the content and services that the content distribution server 102 provides, the server 102 authenticates the given user and/or client device (e.g., 126a, 128a, 130a, and 132a). The content distribution server 102 provides a logon component 104 that allows for the authentication of clients 126a, 128a, 130a and 132a and/or users of a given client device. A client device 126a, 128a, 130a, and 132a initializes its TV client application 126b, 128b, 130b, and 132b and messenger client application 126c, 128c, 130c, and 132c, which initiates the generation and transmission over the network 190 of a logon request to the logon component 104. According to an embodiment of the invention, the logon request comprises information identifying the user of the client device in addition to information regarding the client device itself, e.g., a MAC address, IP address, phone number or other uniquely identifying descriptor. By providing information regarding the user, the content distribution server 102 may provide a personalized experience to the user regardless of the specific client device 126a, 128a, 130a, and 132a with which the user connects to the content distribution server 102.

The logon component 104 receives the logon request from a given client 126a, 128a, 130a, and 132a and attempts to authenticate the user and/or device. The logon component 104 may access a profile 108 for the given user that a profile data store 106 maintains. Accordingly, the logon component 104 uses information identifying the user in an attempt to authenticate the identity of the user, e.g., against information contained in the user's profile 108. The identifying information may comprise a username and password whereby the logon component 104 conducts a comparison to ensure that the received password is identical to a stored password. Alternatively, or in conjunction, the logon component 104 may conduct an exchange of public keys with the client 126a, 128a, 130a, and 132a whereby each device (client and logon component) encodes outgoing data with the received public key and decodes received data with its private key. The logon component 104 may also receive information regarding the client device 126a, 128a, 130a, and 132a, e.g., a MAC address or other uniquely identifying indicia, to authenticate the client device or otherwise validate that the client 126a, 128a, 130a, and 132a may connect to the content distribution server 102.

The content distribution server 102 may also implement a logon proxy 104a to provide scalability and the flexibility to handle large numbers of clients 126a, 128a; 130a, and 132a attempting to connect to the logon component 104. Multiple client devices 126a, 128a, 130a, and 132a initiate communication over the network 190 with a given one of one or more logon proxies 104a. Each logon proxy 104a initiates communication with the logon component 104, thereby allowing the logon component 104 to service a large number of client requests without the necessity of maintaining and managing a connection with each requesting client 126a, 128a, 130a, and 132a.

Where the logon component 104 is unable to successfully authenticate the user or client 126a, 128a, 130a, and 132a, the logon component 104 prevents the client 126a, 128a, 130a, and 132a from accessing functionality that the content distribution server 102 offers. Alternatively, the logon component 104 may solely provide access to the TV application component 112, electronic program guide component 118 and EPG data store 120, thereby allowing the user to view television content and scheduling data on the client 126a, 128a, 130a, and 132a. A user whom the logon component 104 is unable to authenticate is therefore presented with a traditional digital television content viewing experience with content from one or more content sources 114a and 114b, as well as program guide data for his or her locality.

Where the logon component 104 successfully authenticates the user and/or client device, the logon component 104 may record an indication of the successful authentication in the user's profile 108 in the profile data store 106. The logon component 104 provides an indication to the messaging server 110 and the TV application component 112 that the user and/or client 126a, 128a, 130a, and 132a has been successfully authenticated and may be provided with access to the content distribution server 102 and its constituent components identified above. Upon successful authentication, the messaging server 110 passes the identity of the user to the profile component 116, which retrieves the user's profile 108 from the profile data store 106 for transmission to the messaging component 110. The messaging component 110 may also provide the TV application 112 with a copy of the user's profile 108, or the TV application component 112 may obtain a copy of the user's profile 108 directly from the profile component 116.

The content distribution server 102 maintains a user profile 108 for each user in a profile data store 106, which is managed by a profile component 116. As indicate above, a user profile 108 maintains authentication information for the user, such as a username and password. The user profile may also be used by the messaging component 110 and TV application component 112 for the recordation of user interaction with the components, 110 and 112, respectively. Accordingly, the user profile may maintain an historical record of the interactions of the user with the content distribution server 102. Those of skill in the relevant arts(s) should understand, however, that a subset of this historical interaction could be written to the user profile 108. For example, when the user is using the TV application component 112 to view television content, the TV application component 112 sends a message to the profile component 116 to write indicia to the user's profile 108 in response to the receipt of a command, e.g., a change channel command. Similarly, when the messaging component 110 provides messaging content and related services to the user, the messaging component 110 sends a message to the profile component 116 instructing it to write indicia to the user's profile 108 in response to the receipt of a command, e.g., sending a message to another user or stepping into an online game.

The profile 108 also maintains a user's "context". According to an embodiment, a user's context may be a notion of an action that a given user is performing at a given point in time, which may also include the location from which the user is performing that action. Put another way, a user's context may be what the user is doing at a given point in time, e.g., watching a given television channel, playing an online game, listening to music, conducting an online transaction, etc. The context may also indicate from where or what type of device the client is connecting to the content distribution server 102, e.g., a set top box 126a and 128a, a personal computer 130a, a mobile device 132a, etc. By providing the user's context to the messaging component 110 and the TV application component 112, each component, 110 and 112, is capable of identifying and retrieving the proper content to provide the user with messaging content and related services unified with television content and related services as is explained in greater detail herein. The profile component 116 receives updates to the given user's context from the messaging component 110 and TV application component 112 that the profile component 116 writes to the user profile 108 for the given user. The profile 108 for a given user therefore maintains an historical record of the user's context over a period of time.

The profile may also maintain information regarding other users of the system 100 to whom a given user is related. For example, the given user may use a messenger application 126c, 128c, 130c, and 132c on a client device 126a, 128a, 130a, and 130a to identify one or more buddies, the identities of which are written to the given user's profile 108. By traversing groups of related users, the profile component 116 is operative to identify social networks of users. Communities of users may also exist whereby an indication of the membership in a community is written to the given user's profile 108. Similarly, the profile component 116 may identify subsets of a given user's buddies from the given user's total set of buddies. According to an embodiment, the profile component 116 calculates a social network for a given user that comprises all users with an N-degree relationship to the given user. For example, User A maintains a direct relationship with User B, and User B maintains a direct relationship to user C. User A and User C are related by two degrees, whereas each is related to User B by one degree.

The TV application component 112 identifies the user's context and retrieves the proper television content for transmission over the network 190 to the client device 126a, 128a, 130a, and 132a with which the user is interacting. Furthermore, the TV application component 112 may retrieve ancillary television content including, but not limited to, audio, video, text, images and combinations thereof. According to an embodiment of the invention, the TV application component 112 retrieves television content and ancillary television content from a local content data store 114a, which may aggregate television content and ancillary television content from a variety of disparate sources. Alternatively, or in conjunction, the TV application component 112 receives television content and ancillary television content from a local content data store 114a, as well as over the network 190 from a remote content data store 114b, where required content resides remotely from the server 102. Similarly, the TV application component 112 may collect television content from a plurality of television content distribution systems (not pictured) for storage in the local and remote content data stores, 114a and 114b, respectively. The TV application component 112 may selectively transmit television content to users on the basis of a schedule for the transmission of television content promulgated by the television content distribution system 100 for the region in which a given user is located.

The messaging component 110 is also provided with the user's context, thereby allowing the messaging component 110 to know what actions the user is performing, e.g., watching television content, viewing ancillary television content, playing an online game, listening to music, etc. Because the messaging component 110 is aware of the user's identity, the messaging component 110 may identify other users in the given user's social network, also referred to as the user's "buddies". With knowledge of the given user's identity and other users in the given user's social network, the messaging component 110 may instruct the TV application 112 to propagate the given user's context to other users in the given user's social network. Propagating the user's context may include generating an image representing the user's context, which may further include other data describing the user's context (e.g., text, audio, video, combinations thereof, etc.). Alternatively, information regarding the user's context may be used to lookup and retrieve additional related information from a content data store 114a and 114b. The TV application server 112 presents other users in the given user's social network with the given user's context, such as through the presentation of an icon. The TV application server 112 may provide a given user with the context of other users in the given user's social network, and vice versa.

The following example may be illustrative and is not intended to be limiting. Assume that the user is watching the television program "The Apprentice" on channel three. According to an embodiment, the messaging component 110 identifies the user's buddies and instructs the TV application component 112 to propagate the user's context to his or her buddies. The TV application component 112 generates a thumbnail image representing the program "The Apprentice", which the TV application component 112 propagates to the given user's buddies. The thumbnail is presented on a client device for a given buddy with information describing the program, e.g., the tile and the fact that the user is watching the program on channel three. The TV application server 112 may modify information regarding the given user's content, e.g., scaling down the thumbnail image, on the basis of a given destination client device 126a, 128a, 130a, and 132a.

Because the messaging component 110 is aware of a given user's context and may receive input from a given client device 126a, 128a, 130a, and 132a, users of the content distribution server 102 may interact with one another. The messaging component 110 provides a given user's context to the TV application component 112, which propagates the context to other users in the given user's social network and vice versa. The given user may select an indication of the context of other users in the given user's social network to initiate an action. Initiating an action may include starting an instant message conversation with the selected user, switching context to the context of the selected user, etc. Selections are passed to the messaging component 110, which performs the requested action and provides content for the TV application component 112 to consume and propagate as is appropriate to other users. One illustrative use of this functionality is shared viewing of content between a plurality of users, shared remote control functionality between a plurality of users, combinations thereof, shared remote and shared viewing with instant messaging between a plurality of users, etc.

The messaging component 110 also provides access to other application components 122. Alternatively, other application components 122 may communicate directly with the TV application component 112 to provide content for distribution to one or more client devices 126a, 128a, 130a, and 132a in communication with the content distribution server 102 over the network 190. One exemplary other application component 122 is an online poker playing application. As an online poker playing application, the other application component 122 handles the main program logic for an online poker playing game. Each user's context (which may comprise location information (e.g., playing online poker), the identities of other players in the game, what the given user's action is (hit, hold, double down), etc.) is provided to the messaging component 110, which passes information regarding a given user's context to the TV application component 112 for propagation to other players in the game.

Propagation of information regarding a given user's context may also be propagated to other users in a given user's social network who are not necessarily playing the online poker game. Those of skill in the relevant art(s) should recognize that other application components 122 falling within the scope of the present invention are not limited to online poker playing components, and may include other applications that may interact with the messaging component 110, including, but not limited to, music engines whereby the messaging component 110 may instruct the TV application component 112 as to the current song to which a user is listening, search applications whereby the messaging component 110 may instruct the TV application component 112 as to the keywords over which a user is searching and the related result set, etc. These are examples of a given user's context that the TV application component 112, in conjunction with the messaging component 110, may propagate to users of the content distribution server 102 to provide for a shared content consumption experience.

As indicated above, the TV application component 112 may propagate a given user's context to other users in the given user's social network, which may include channel information regarding a television program that the given user is viewing. An issue arises, however, when individual users are accessing television content in different time zones and locations with different channel assignments. The content distribution server 102 includes an electronic program guide component 118 communicatively coupled to the network 190 and operative to receive electronic program guide information, e.g., the program schedule for a given location and time zone. The electronic program guide component 118 queries program guide servers (not pictured) that are in communication over the network 190, such as the program guide servers operated by Tribune Media Services (Chicago, Ill.). The electronic program guide component 118 stores the one or more electronic program guides in an EPG data store 120. According to an embodiment of the invention, the EPG data store 120 is a relational database, but may be substituted by a tab delimited data store, a comma delimited data store, an object oriented database, a hybrid object-relational database, or other data stores known to those of skill in the relevant art(s). Systems and methods for generating electronic program guides include U.S. Pat. No. 6,813,774, entitled "PROGRAM GUIDE DISPLAY APPARATUS AND PROGRAM GUIDE DISPLAY METHOD;" U.S. Pat. No. 6,763,522, entitled "SYSTEM AND METHOD FOR A DIGITAL TELEVISION ELECTRONIC PROGRAM GUIDE;" and U.S. Pat. No. 6,611,958, entitled "ELECTRONIC PROGRAM GUIDE FEATURE FOR AV SYSTEM;" the disclosures of which are all hereby incorporated by reference in their entireties. Furthermore, those of skill in the relevant art(s) would recognize a number of electronic program guides are commercially available, including those available from Pioneer Electronics Inc. (Long Beach, Calif.), Scientific-Atlanta, Inc. (Lawrenceville, Ga.), Motorola Inc. (Schaumburg, Ill.), Gemstar-TV Guide International, Inc. (Los Angeles, Calif.), Charter Communications (Madison, Wis.), etc.

When the TV application component 112 propagates a given user's context to other users in the given user's social network, the TV application component 112 may query the electronic program guide component 118 to determine a local context for a user in the social network that corresponds to the user's context. For example, where the user is viewing a program on the ABC network, that same program is not necessarily being transmitted on the same channel in all locations and time zones, if the program is being transmitted at all. Accordingly, for each user in a given user's social network to which the TV application component 112 is to transmit a given user's context, the electronic program guide component 118 retrieves the electronic program guide from the EPG data store 120 for a user in the social network.

The electronic program guide component 118 executes a search in an attempt to locate the program that the given user is viewing in the electronic program guide. If successful, the electronic program guide component 118 instructs the TV application component 112 as to the channel on which the user in the social network may find the program that the given user is viewing being transmitted. The TV application component 112 may propagate this information as part of the given user's context. Where the electronic program guide component 118 cannot locate the given user's context in the electronic program guide, e.g., the program that the given user is viewing is not presently being transmitted in the time zone in which the user in the social network is located, the electronic program guide component 118 may identify alternate times at which the program is being transmitted, which the TV application component 112 may also propagate as part of the given user's context. The TV application component 112 transmits this information to the user in the social network. Where the client device 126*a*, 128*a*, 130*a*, and 132*a* comprises digital video recording functionality ("DVR"), the TV application component 118 may provide the user in the social network with an opportunity to schedule recording of the program. Recording may also comprise the recording of content that is not selectable by a given user through interaction with an EPG, e.g., Internet based content. It should be noted that selection of a program or other content for recording could be recorded in the user's profile as a context or context change.

As an alternative to the foregoing, or in conjunction therewith, the content distribution server 102 may use a unique identifier to identify each program that it is transmitting to clients 126*a*, 128*a*, 130*a*, and 132*a*, e.g., stored in the EPG data store 120. The electronic program guide component 118 searches the EPG data store 120 to locate the program that the given user is viewing and determines the program's unique identifier, which the TV application component 112 may propagate as part of the given user's context. A client device 126*a*, 128*a*, 130*a* and 132*a* that a user in the given user's social network is operating receives the given user's context and attempts to identify the program that the given user is viewing in a local electronic program guide, which may be stored on the client 126*a*, 128*a*, 130*a*, and 132*a* or retrieved from a network source. If successful, client side software, e.g., a TV client 126*b*, 128*b*, 130*b*, and 132*b*, instructs the user in the social network as to the channel on which he or she may find that program that the given user is viewing, which may include allowing the user in the social network to tune to channel on which the TV application component 118 is transmitting the program. Where the identifier for the program cannot be located in the local electronic program guide, client side software may identify alternate times at which the program is being transmitted. Where the client device 126*a*, 128*a*, 130*a*, and 132*a* comprises DVR functionality, the client 126*a*, 128*a*, 130*a*, and 132*a* may provide the user in the social network with an opportunity to schedule recording of the program. Recording functionality of the DVR may also include the recording of content that does not appear in an EPG, e.g., Internet based content.

As discussed above, interaction with the messaging component 110 and TV application component 112 may be recorded by the profile component 116, which maintains a profile 108 for each user in a profile data store 106. In other words, the profile 108 contains a history of the user's context changes as a function of time, allowing decisions to be made regarding the given user's preferences on this basis. For example, where the user's context is identified as viewing science function programs for long periods of time and news programs for short periods of time, a decision may be made that the user prefers science function programs. This may also account for sub-genres, e.g., science function/action, science function/horror, etc. Each profile 108 may also comprise context information as a function of time for other users in a given user's social network, as well as other users that utilize the content distribution server 102.

A recommendation component 124 may utilize user profiles 108 in the profile data store 106 to supply recommended programming to the user, which may also include providing recommendations for using other applications (via other application components 122), such as in response to online events, users with whom a given user might want to be a buddy, ancillary television content, etc. According to embodiments of the invention, the recommendation component 124 may utilize a user profile 108 in determining recommended content to a user. Alternatively, or in conjunction with the foregoing, the recommendation component 124 may also utilize the user profiles 108 of a given user's buddies, e.g., the profiles 108 of those users that are in the given user's social network. The recommendation component 124 may also compute a vector for the given user's profile 108 and include those users with similar profile vectors in its calculation of recommended content. Also, the recommendation component 124 may utilize profiles 108 for user communities, which contain aggregate context information for a community of users, when determining recommended content. Similarly, the recommendation component 124 may utilize a personalization service, such as the MY YAHOO!® customizable web service available from Yahoo! Inc. (Sunnyvale, Calif.), which allows users to create and edit their own profiles for indicating media preferences (e.g., favorite channels or television programs). Such profiles are stored on servers (which may be profile data stores 106) available from Yahoo! Inc. and made available to the recommendation component 124.

The recommendation component 124 allows the content distribution server 102 to harness the viewing experience, habits and preferences of the users who are interacting with the content distribution server 102. As indicated above, the recommendation component 124 may provide recommendations beyond television content, extending to all services that the content distribution server 102 offers. For example, a user may interact with the messaging component 110 to access other application components 122 through the TV application component 112. One exemplary other application component 122 is an online poker game in which users play against each other online. Where the user profile indicates that the user spends substantial time in the context of an online poker application 122, the recommendation component 124 may alert the user when an upcoming online poker tournament is approaching.

The system 100 of the present invention illustrated at FIG. 1 provides for a shared content consumption experience for users of the content distribution server 102. A given user may be informed of the context of other users of the system 100, including users in the given user's social network. According to an embodiment, icons and accompanying textual data are propagated by the TV application component 112 and presented to the given user on a client device 126a, 128a, 130a, and 132a, indicating the context of other users of the server 102. The presentation of the context of other users in conjunction with the presentation of television content allows for a shared viewing experience whereby a given user may know the context of other users and may change his or her context to that of another user. For example, where the context of a user in a given user's social network indicates the user in the social network is watching a program that is enjoyable to the given user, the given user may change his or her context to match that of the user in the social network (e.g., tuning to receive transmission of the same television content that the user in the social network is consuming). Using the architecture described herein, a number of applications become available in the context of the television consumption process, including, but not limited to, personalization, community viewing, shared presence and context, messaging, access to ratings and recommendations (including community reviews), alerts, etc.

The content distribution server 102 provides access to it functions and application components through the use of one or more application program interfaces ("API") 150. An API 150 is an interface, or set of calling conventions, by which a given application component accesses other application components and the services that the application components offer. By using the API 150, a given application component advertises information regarding the functions and/or services that the given application component may provide to other components, which may also include the technique by which the functions or services are accessed. This allows the application components comprising the system 100 to access supporting system and network services. For example, the API 150 allows client side applications (e.g., messenger applications 126c, 128c, 130c, and 132c) to issue function calls for the performance of actions and accessing of services, such as tuning a channel, accessing an online game, listening to music, allowing the messenger component 110 to interface with the TV application component 112 or a messaging client to access EPG data, etc., as described herein. Although FIG. 1 illustrates the API 150 as a separate system component, those of skill in the relevant art(s) recognize that each application component may provide an individual API 150 identifying the specific functions and services a given application component provides. Furthermore, application components, e.g., a messenger application 126c, 128c, 130c, 132c, resident on client devices 126a, 128a, 130a, 132a may provide one or more APIs 150 advertising the functions and service the given application component provides.

As described above, system 100 distributes various types of entertainment and/or information content over communications network 190. In an embodiment, system 100 distributes informational alerts to one or more subscribers (e.g., clients 126a, 128a, 130a, or 132a that have subscribed to receive the informational alert service) while the subscribers are receiving one or more types of content. For example, while viewing a television program or participating in an online game on a client display (e.g., clients 126a, 128a, 130a, or 132a), a user may receive a breaking news alert on the client display that includes captions regarding current weather, sports, finance, or related headline news.

Figure 2A:
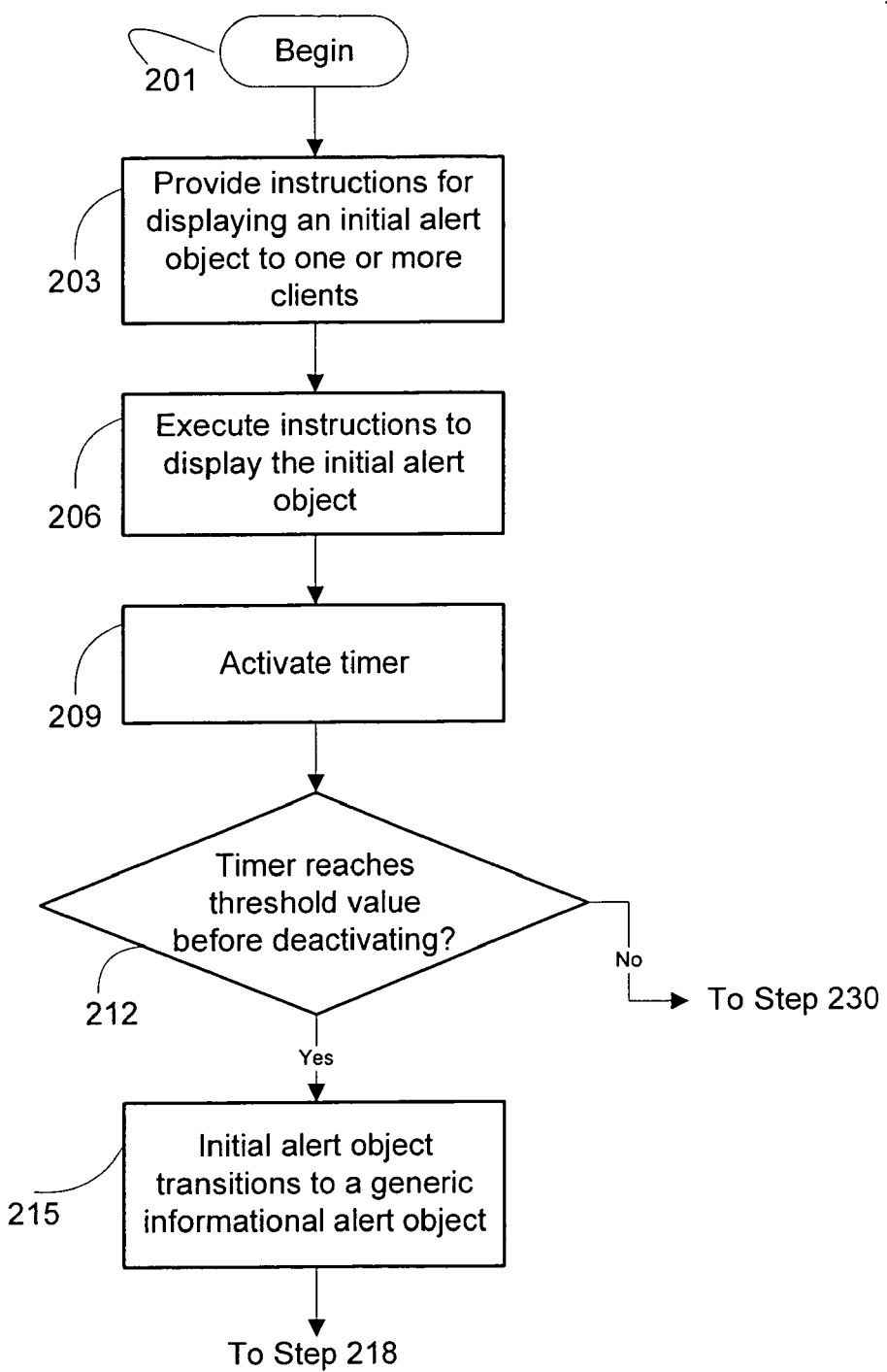
FIGS. 2A-2B illustrate distributing interactive informational alerts according to an embodiment of the present invention.
Figure 2B:
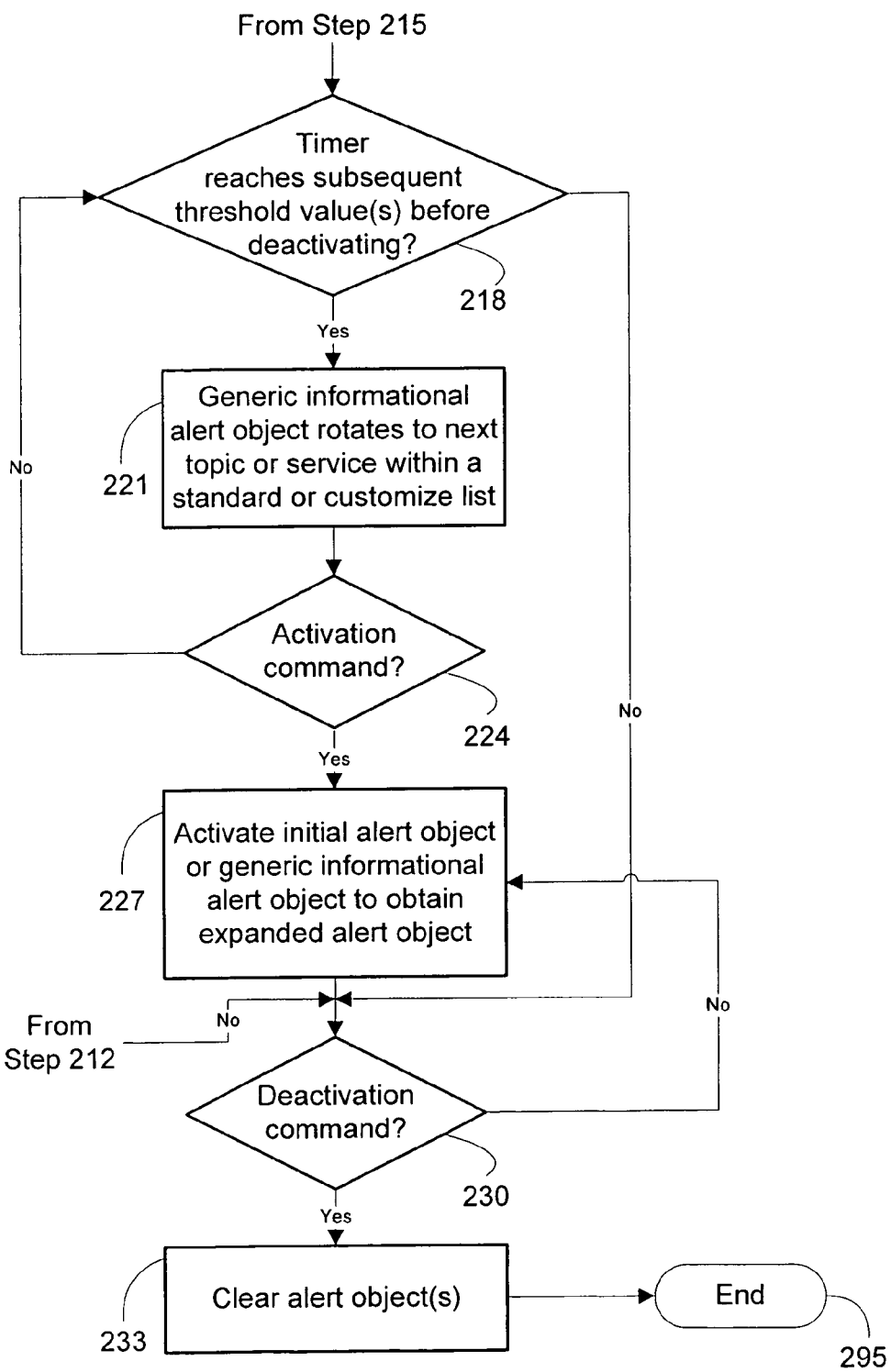

An embodiment of a method for distributing informational alerts to a client device is illustrated in FIGS. 2A and 2B. More specifically, the method 200A and 200B provides an example for distributing interactive informational alerts capable of presenting content, which may be from general to more specific, as requested by a user. The control flow begins at step 201, passing control to step 203. At step 203, instructions for displaying an initial alert object are provided to one or more subscribing clients. The instructions are received and executed by the subscribing clients to display the initial alert object, step 206, which signals the user that the subscribed informational alert service is commencing.

Figure 3:
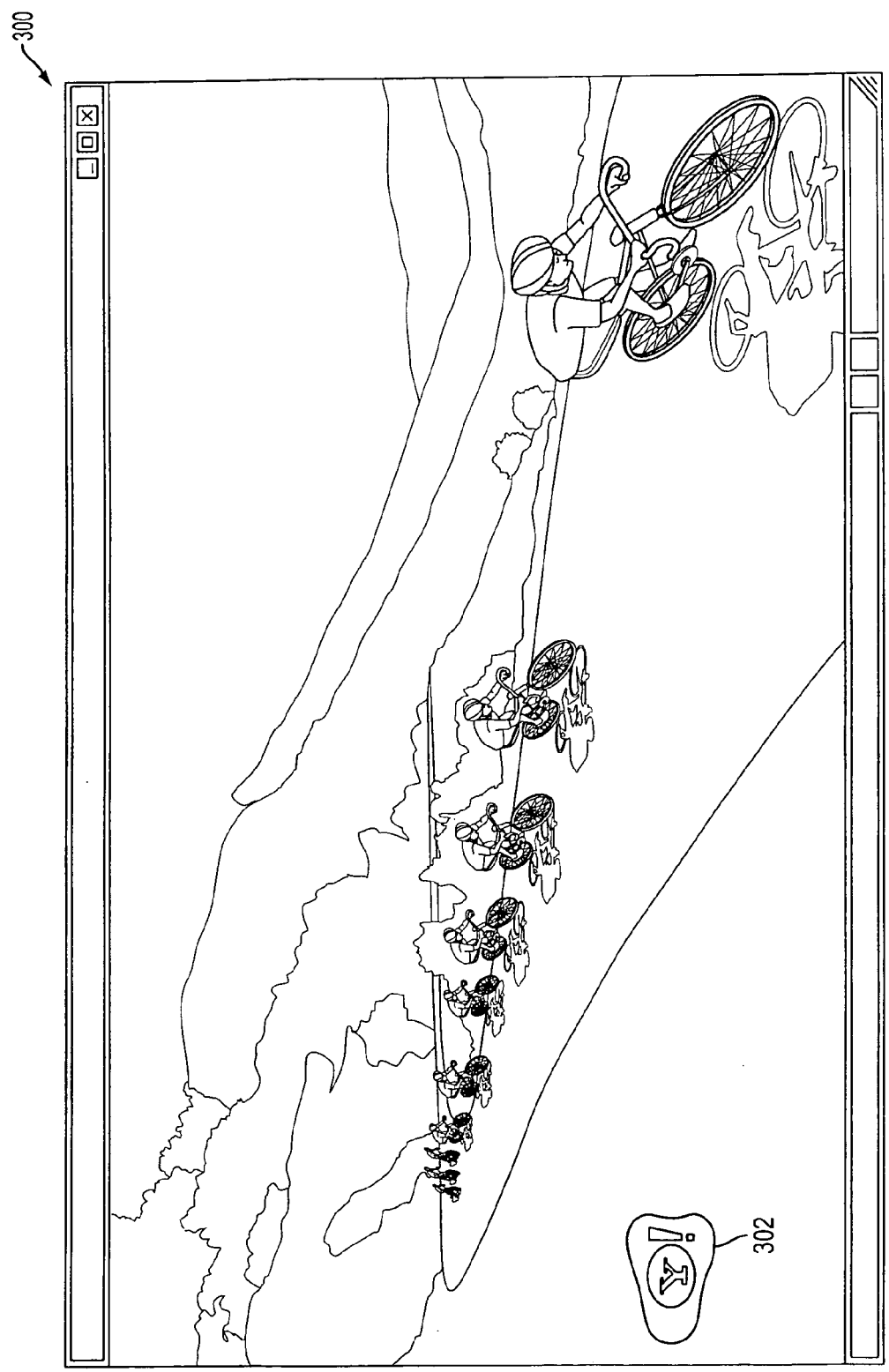
FIG. 3 illustrates a graphical user interface that includes an initial alert object according to an embodiment of the present invention.

The initial alert object may be an icon or other type of graphic that represents the information service provider that prepares, updates, and/or provides the content for the informational alert. FIG. 3 illustrates a graphical user interface 300 that illustrates an initial alert object 302 according to an embodiment. As shown, initial alert object 302 is a Yahoo! logo that is superimposed, keyed, or overlaid over a video broadcast. It should be understood that the video broadcast is being described herein for illustrative purposes, and not by way of limitation. As discussed above, interface 300 may present other types of entertainment and/or information content (e.g., online gaming, digital radio, web browsing, etc.) during the commencement of the informational alert service.

A server-side messaging component (e.g., messaging component 110) may send instructions for displaying initial alert object 302. Initial alert object 302 may be displayed on a periodic or scheduled basis. As such, the messaging component can periodically send instructions to display initial alert object 302. Alternatively, a client-side application can be installed at the client device (e.g., clients 126a, 128a, 130a, or 132a) and programmed to periodically display initial alert object 302. In another embodiment, initial alert object 302 is displayed on demand as requested by a user. Accordingly, the user operates an input device (e.g., remote control unit (RCU), pointing device, keyboard, voice communications interface, or the like) to request the client messenger application (e.g., messenger application 126c, 128c, 130c, or 132c) to query the messaging component for informational alerts, which in turn initiates the display of initial alert object 302.

Figure 4:
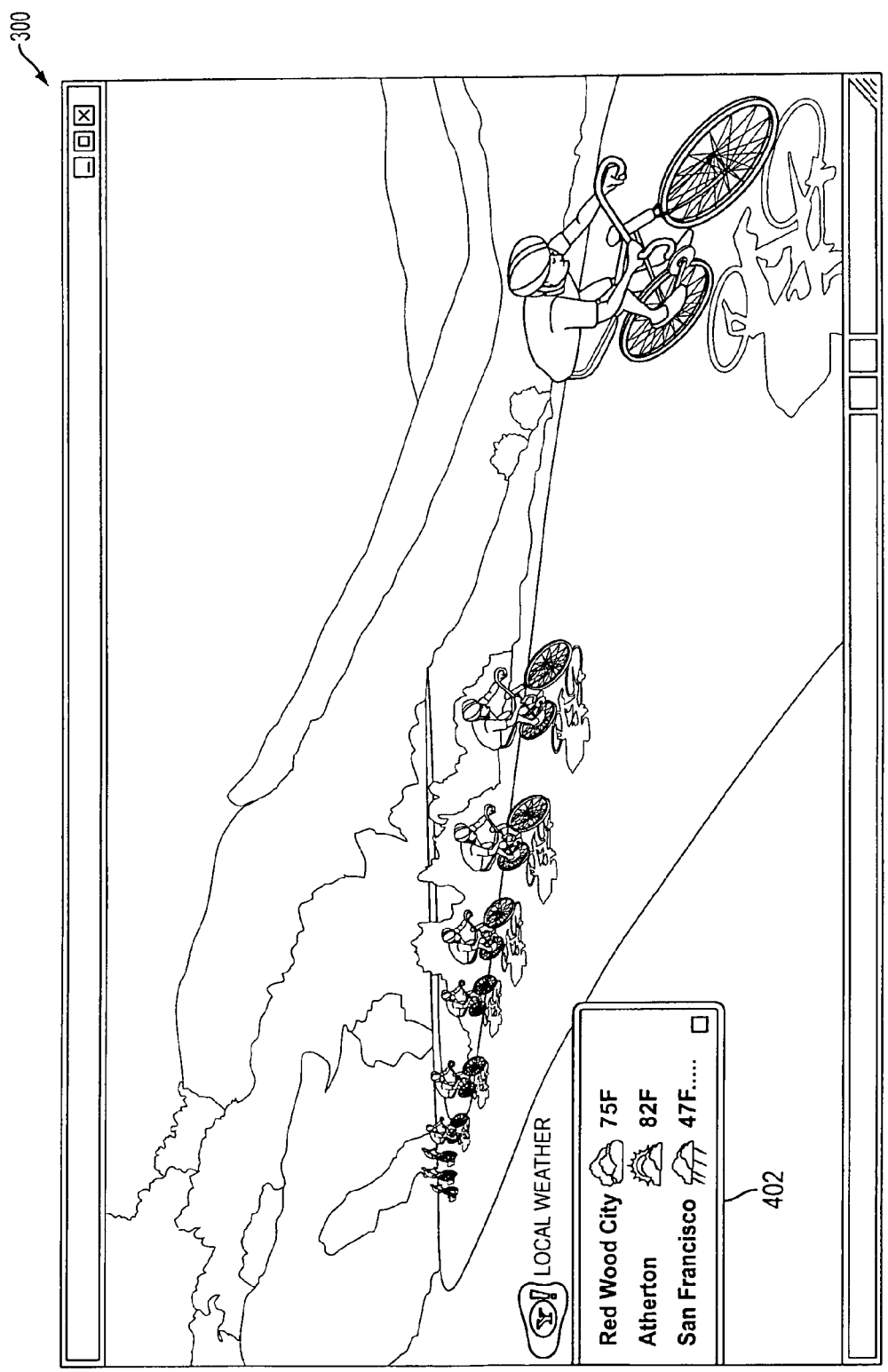
FIG. 4 illustrates a graphical user interface that includes a generic informational alert object according to an embodiment of the present invention.

Referring back to FIG. 2A, a timer is activated upon display of the initial alert object, step 209. When the timer reaches a threshold value at step 212, the initial alert object transitions to a generic informational alert object, step 215. If the timer is deactivated before reaching the threshold value (e.g., the user cancels the initial alert display before it converts to the generic informational alert object), control passes to step 230 as discussed below. FIG. 4 illustrates an embodiment of a generic informational alert object 402 that is superimposed over the video broadcast in interface 300. For example, generic informational alert object 402 may include local weather information for one or more specified localities. In another embodiment, the generic informational alert object 402 is displayed in a separate frame or window than the frame or window displaying the concurrent video broadcast.

According to an embodiment, the messaging component sends instructions that are executed by a client messenger application to transition the initial alert object to generic informational alert object 402. Generic informational alert object 402 can be a transparent, translucent, or opaque graphic that displays information for a specified topic. The available information topics include, but are not limited to, weather, traffic, sports, business, finance, politics, real estate, science, health, technology, international news, local news, entertainment, law, or the like. In addition to other available information topics, generic informational alert object 402 can be a link (e.g., hyperlink) to other entertainment or information services, such as email, instant messaging, web browser applications, or the like. The listing of available information topics and/or services may be standardized and made available by an information service provider, such as Yahoo!. Alternatively, or in conjunction with the foregoing, a user can customize the listing of available information topics and/or services. As such, the customized selection of user-preferred topics and/or services can be stored with the user's profile 108 in profile data store 106. Alternatively, the customized selection of user-preferred topics and/or services can be stored at a remote site hosted by the information service provider. The messaging component uses the customized selections from the user profiles to build the generic informational alert objects.

In addition to allowing each user to personally customize the generic informational alert objects, customization may also be based on a combination of user profiles from other system users or from users in a particular social network (such as, a buddies list, professional associations, alumni associations, educational environments, consumer mailing lists, trade groups, online gaming communities, organizational intranets or virtual private networks, other user communities, and the like). The messaging component may select a combination of user profiles from a particular social network for a given user and generate a generic information alert object that is specifically tailored for that particular social network.

Referring FIG. 2B, the timer keeps running at step 218 unless the generic informational alert object is activated at step 224, or the generic informational alert object is deactivated or times-out at step 230, both of which are discussed in greater detail below. If no activation or deactivation commands are detected when the timer reaches a subsequent threshold value at step 218, the generic informational alert object (e.g., object 402) rotates to the next generic topic or service within the standardized or customized list at step 221. The control flow of steps 218 and 221 repeats for subsequent threshold values. For example, generic informational alert object 402 can transition to the next generic topic or service every four seconds.

Figure 5:
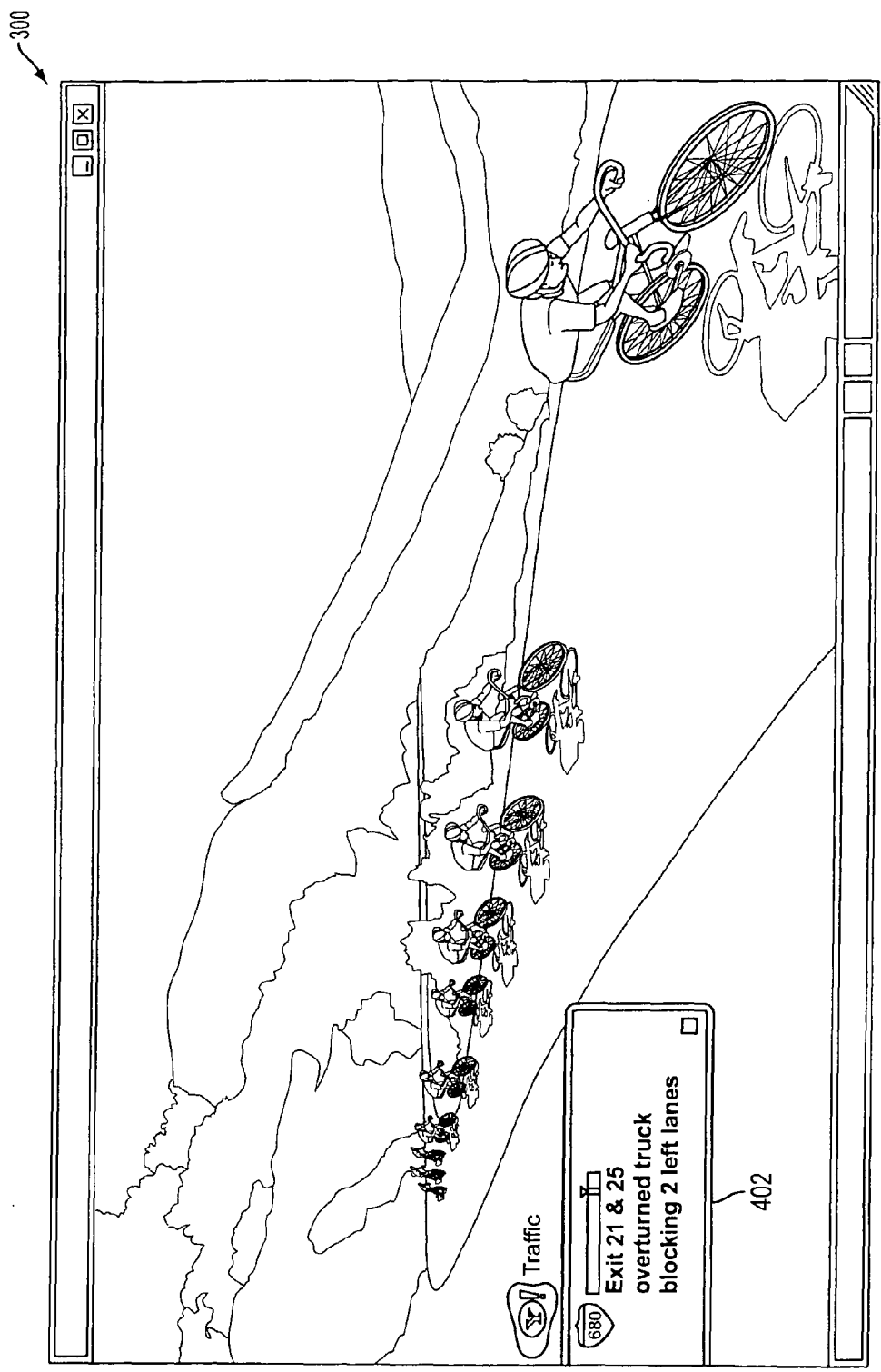
FIG. 5 illustrates a graphical user interface that includes a generic informational alert object according to another embodiment of the present invention.
Figure 6:
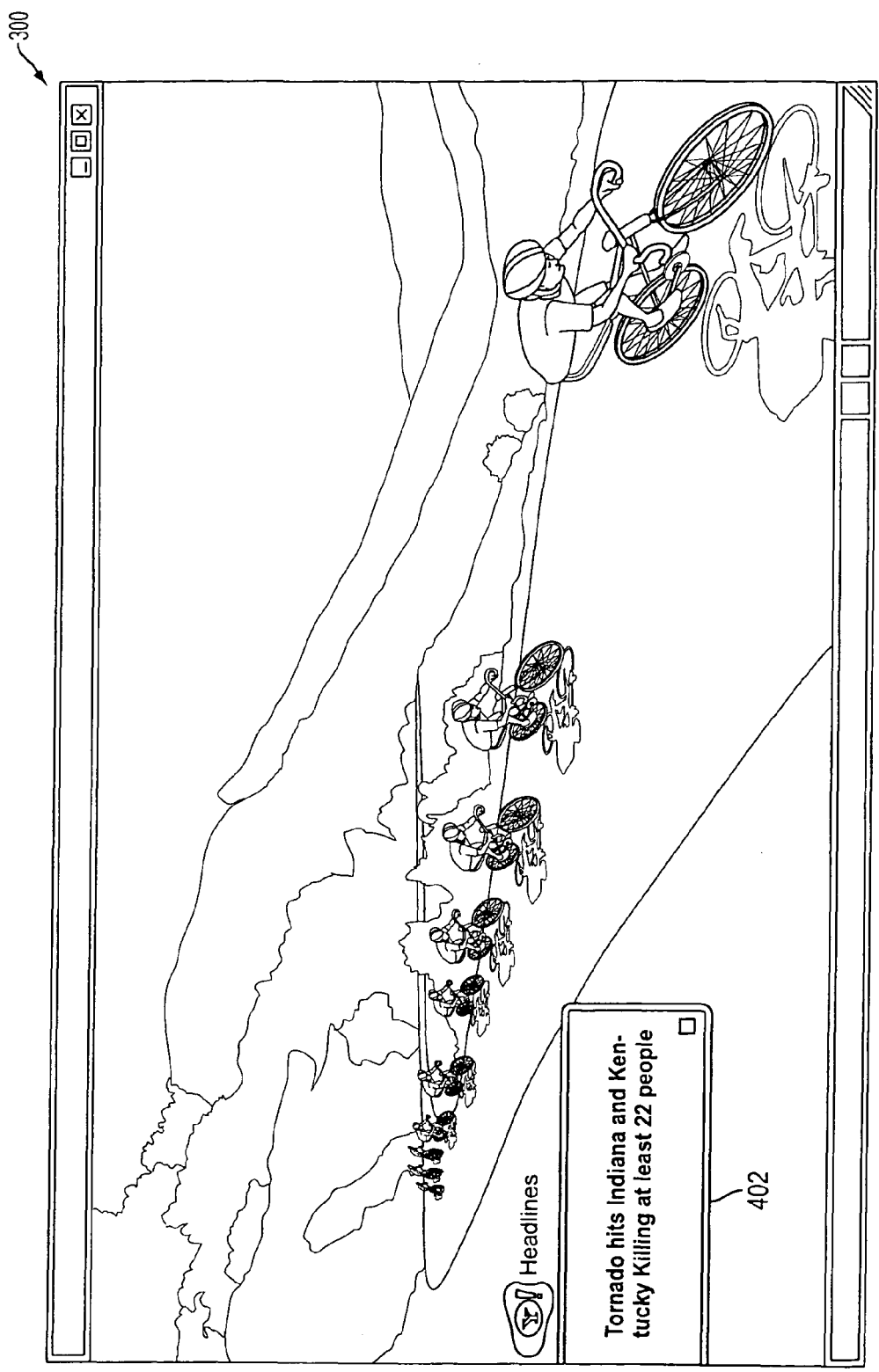
FIG. 6 illustrates a graphical user interface that includes a generic informational alert object according to another embodiment of the present invention.

Referring to FIG. 5, interface 300 shows that generic informational alert object 402 has transitioned from displaying information regarding local weather to displaying information regarding traffic for a specified locality. FIG. 6 illustrates another embodiment of interface 300 showing that generic informational alert object 402 has transitioned from displaying information regarding traffic to displaying information regarding news headlines.

At any time during the display of the initial alert object (e.g., object 302) or any generic informational alert object (e.g., object 402), the user can operate an input device (e.g., RCU, pointing device, keyboard, voice communications interface, or the like) to activate the initial alert of generic information object (e.g., object 302 or 402). Referring back to FIG. 2B at step 227, the initial alert object or one of the generic informational alert objects are activated, step 224. Upon activation, a generic topic or service is selected and an expanded display of additional information or options is presented for the specified topic or service. For example, if the initial alert object (e.g., object 302) is activated, the first generic topic or service in the customized or standardized list of available topics and/or services is selected for an expanded display. Alternatively, the displayed topic or service can be randomly selected from the customized or standardized list. If a generic informational alert object (e.g., object 402) is activated, the specified information topic or service for the activated generic informational object is selected for an expanded display.

Figure 7:
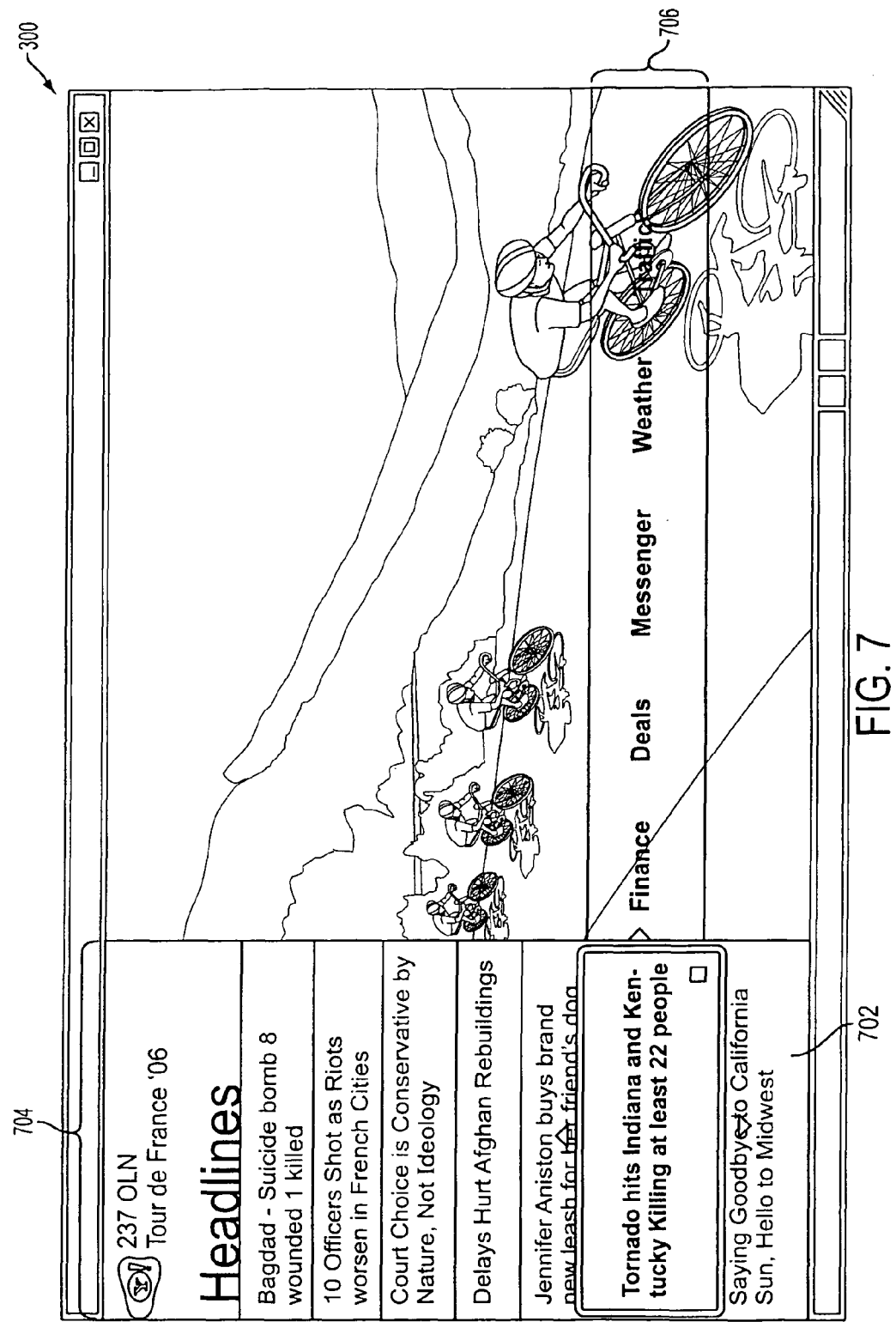
FIG. 7 illustrates a graphical user interface that includes an expanded informational alert object according to an embodiment of the present invention.
Figure 8:
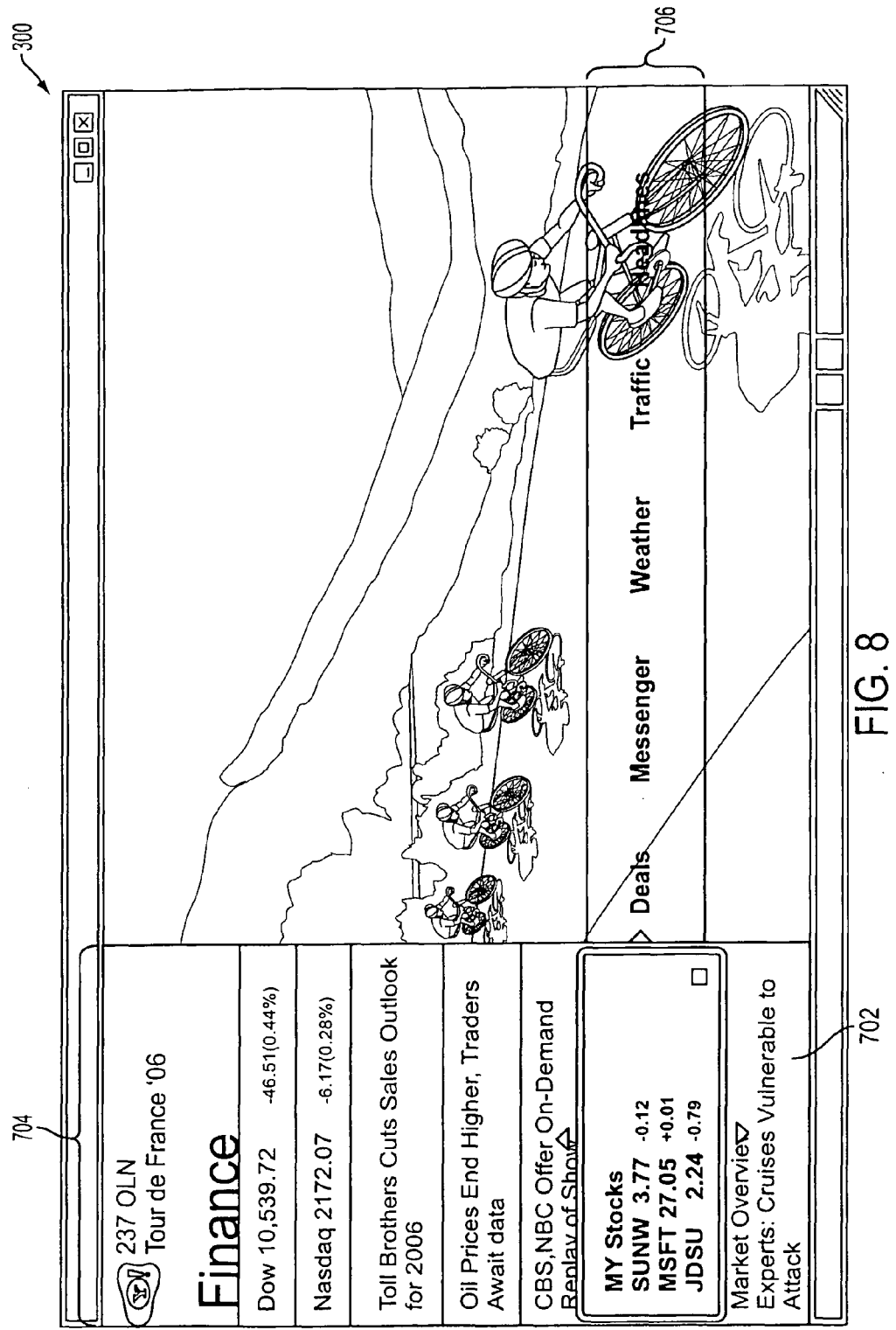
FIG. 8 illustrates a graphical user interface that includes an expanded informational alert object according to another embodiment of the present invention.

FIG. 7 illustrates another embodiment of interface 300 that shows an expanded informational alert object 702 superimposed over a video broadcast. The news "headlines" generic informational alert object 402 shown in FIG. 6 has been activated to produce the expanded informational alert object 702 of FIG. 7. The expanded object 702 includes a vertical plane 704 and a horizontal plane 706. The vertical plane (or "toolbar") 704 includes a listing of additional information related to the generic information topic new "headlines." The horizontal plane or toolbar 706 includes a listing of other available generic information topics and/or services (e.g., finance, deals, messenger, weather, traffic). The user may operate an input device to traverse the vertical plane 704 and/or horizontal plane 706, and toggle the available options. For example, FIG. 8 illustrates another embodiment of interface 300, wherein the user as traversed horizontal plane 706 to switch from news "headlines" to "finance" as shown in vertical plane 704.

Referring back to FIG. 2B at step 230, a deactivation command can be issued at any time following the activation of the initial alert object (e.g., object 302). At any time during the display of the initial alert object (e.g., object 302), any generic informational alert object (e.g., object 402), or any expanded informational alert object 702, the user can operate an input device (e.g., RCU, pointing device, keyboard, voice communications interface, or the like) to deactivate and remove the interactive informational alerts (e.g., object 302, 402, or 702) from the client display. Alternatively, the interactive informational alert objects can be removed upon expiration of a threshold time period, which may be set by a user or system administrator.

Upon detection of a deactivation command, the interactive informational alert objects (e.g., object 302, 402, or 702) are removed from the display (e.g., interface 300) at step 233. Following the removal of the interactive informational alert objects, the control flow ends as indicated at step 295. Alternatively, control flow may return to step 209 with the reactivation of the timer and execution of the method of FIGS. 2A and 2B.

FIGS. 1-8 are conceptual illustrations allowing an explanation of the present invention. It should be understood that various aspects of the embodiments of the present invention could be implemented in hardware, firmware, software, or a combination thereof. In such an embodiment, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computerized method of providing an informational alert to a user in communications with a client device configured to receive entertainment services or information services from a content distribution system, the method comprising:
    presenting an entertainment service or an information service on a client display to the user;
    determining a context of a user using the client display, the context comprising a notion of an action that a given user is performing at a given point in time;
    accessing instructions to display an informational alert object during said presenting of the entertainment service or the information service;
    determining a plurality of related users representing a social network in which the user is a member, based on user profile information and a degrees of relationships between users;
    displaying the informational alert object at the client device on the basis of the user profiles of the related users that represent the social network in which the user is a member and on the basis of the determined user context, the displaying being concurrent with said presenting of the entertainment service or the information service; and
    executing instructions to replace the informational alert object with an expanded view of the informational alert object when a request for the expanded view is received from the user.

2. The method of claim 1, wherein said accessing instructions comprises:
    receiving instructions to display an initial alert object that signals initiation of an informational alert service.

3. The method of claim 2, wherein said accessing instructions further comprises:
    displaying the initial alert object when the user requests initiation of the informational alert service.

4. The method of claim 2, wherein said accessing instructions further comprises:
    displaying the initial alert object at a periodically scheduled rate.

5. The method of claim 2, wherein said accessing instructions further comprises:
    transitioning the initial alert object to the informational alert object upon expiration of a first predefined time period.

6. The method of claim 1, wherein said accessing instructions comprises:
    executing instructions to configure the informational alert object to display content related to at least one of weather, traffic, news headlines, or finance.

7. The method of claim 1, wherein said accessing instructions comprises:
    executing instructions to configure the informational alert object to enable user access to at least one of an electronic message, an instant message, or a browser application.

8. The method of claim 1, wherein said accessing instructions comprises:
    enabling the user to customize topics or services represented by the informational alert object.

9. The method of claim 1, wherein said displaying the informational alert object comprises:
    altering the content of the informational alert object at a periodically scheduled rate; and
    displaying the altered informational alert object concurrently with said presenting of the entertainment service or the information service.

10. The method of claim 1, wherein said executing instructions comprises:
    executing instructions to display a first toolbar having a plurality of control objects, wherein activation of one of the control objects produces a display of additional information or options related to the expanded informational alert object.

11. The method of claim 1, wherein said executing instructions comprises:
    executing instructions to display a second toolbar having a plurality of control objects, wherein activation of one of the control objects produces a display of other topics or services not related to the expanded informational alert object.

12. A computerized method of providing an informational alert to a user in communications with a client device configured to receive entertainment services or information services from a content distribution system, the method comprising:

determining a plurality of related users representing a social network in which the user is a member, based on user profile information and a degrees of relationships between users;

determining a context of a user using the client display, the context comprising a notion of an action that a given user is performing at a given point in time accessing instructions to display one or a plurality of informational alert objects on the basis of the user profiles of the related users that represent the social network in which the user is a member and on the basis of the determined user context, the instructions to display the information alert concurrently with an entertainment service or an information service that is being presenting on the client device;

rotating the display of informational alert objects such that a subsequent informational alert object is displayed concurrently with the entertainment service or the information service; and executing instructions to replace a displayed informational alert object with an expanded view of the displayed informational alert object when a request for the expanded view is received from the user.

13. A computer program product having computer readable program code embedded on a physical storage device for execution by a programmable processor of a computer to cause the computer to provide an informational alert to a user in communications with the computer, wherein the computer is configured to receive entertainment services or information services from a content distribution system, comprising:

a first computer readable program code that causes the computer to present an entertainment service or an information service on a display coupled to the computer determine a plurality of related users representing a social network in which the user is a member, based on user profile information and a degrees of relationships between users, and determining a context of a user using the client display, the context comprising a notion of an action that a given user is performing at a given point in time;

a second computer readable program code that causes the computer to access instructions to display an informational alert object during presentation of the entertainment service or the information service;

a third computer readable program code that causes the computer to display the informational alert object on the device on the basis of the user profiles of the related users that present the social network in which the user is a member and on the basis of the determined user context, the display being concurrent with the presentation of the entertainment service or the information service; and a fourth computer readable program code that causes the computer to execute instructions to replace the informational alert object with an expanded view of the informational alert object when a request for the expanded view is received from the user.

14. The computer program product according to claim 13, wherein said third computer readable program code comprises:

computer readable program code function that causes the computer to alter the content of the informational alert object at a periodically scheduled rate; and computer readable program code function that causes the computer to display the altered informational alert object concurrently with the presentation of the entertainment service or the information service.

15. The computer program product according to claim 13, wherein said fourth computer readable program code comprises:

computer readable program code function that causes the computer to execute instructions to display a first toolbar having a plurality of control objects, wherein activation of one of the control objects produces a display of additional information or options related to the expanded informational alert object.

16. The computer program product according to claim 13, wherein said fourth computer readable program code comprises:

computer readable program code function that causes the computer to execute instructions to display a second toolbar having a plurality of control objects, wherein activation of one of the control objects produces a display of other topics or services not related to the expanded informational alert object.

17. A computerized method of providing an informational alert to a user in communications with a client device configured to receive entertainment services or information services from a content distribution system, the method comprising:

presenting an entertainment service or an information service on a client display to the user;

determining a plurality of related users representing a social network in which the user is a member, based on user profile information and a degrees of relationships between users;

determining a context of a user using the client display, the context comprising a notion of an action that a given user is performing at a given point in time accessing instructions to display an informational alert object being associated with one or more information topics or services selected from a plurality of user profiles that represents the social network in which the user is a member and on the basis of the determined user context, the social network specifies the one or more information topics or services;

displaying the informational alert object on the client device concurrently with said presenting of the entertainment service or the information service; and executing instructions to replace the informational alert object with an expanded view of the informational alert object when a request for the expanded view is received from the user.

18. The method of claim 17, wherein said plurality of user profiles represents members of a buddies list, a professional association, or a consumer mailing list.

* * * * *